(12) United States Patent
Kuntze

(10) Patent No.: US 6,721,241 B1
(45) Date of Patent: Apr. 13, 2004

(54) OPTICAL INFORMATION SYSTEM WITH MOTOR CONTROLLED REFLECTOR MEANS IN A SWIVEL ARM

(75) Inventor: Andreas Kuntze, Berlin (DE)

(73) Assignee: Compact Laser Solutions GmbH, Berlin (DE)

( * ) Notice: Subject to any disclaimer, the term of this patent is extended or adjusted under 35 U.S.C. 154(b) by 0 days.

(21) Appl. No.: 09/331,858

(22) PCT Filed: Dec. 23, 1997

(86) PCT No.: PCT/DE97/03033

§ 371 (c)(1),
(2), (4) Date: Jun. 28, 1999

(87) PCT Pub. No.: WO98/29774

PCT Pub. Date: Jul. 9, 1998

(30) Foreign Application Priority Data

Dec. 27, 1996 (DE) .......................... 196 54 845

(51) Int. Cl.[7] ................................. G11B 7/00
(52) U.S. Cl. ................ 369/44.11; 369/44.21; 369/112.29
(58) Field of Search ............ 369/119, 53.25, 369/53.28, 44.14, 112.29, 44.13, 44.27, 30.15, 47.49, 112.17, 112.2, 30.28, 44.32, 44.11, 110.01, 44.15, 44.21, 112.09

(56) References Cited

U.S. PATENT DOCUMENTS

| | | | | | |
|---|---|---|---|---|---|
| 3,962,688 A | * | 6/1976 | Westerberg | ............... | 369/30.15 |
| 4,139,263 A | * | 2/1979 | Lehureau et al. | ...... | 369/110.01 |
| 4,282,598 A | * | 8/1981 | Elliott | ........................ | 250/202 |
| 4,387,452 A | * | 6/1983 | Bricot et al. | ........... | 369/112.17 |
| 4,727,528 A | * | 2/1988 | Wyland | .................... | 360/78.14 |
| 5,068,843 A | * | 11/1991 | Takeshita et al. | ........ | 369/44.13 |
| 5,153,870 A |   | 10/1992 | Lee et al. | .................... | 369/111 |
| 5,319,509 A |   | 6/1994 | Michelson et al. | ....... | 360/77.03 |
| 5,420,848 A | * | 5/1995 | Date et al. | .............. | 369/112.29 |

FOREIGN PATENT DOCUMENTS

| | | |
|---|---|---|
| DE | 39 15 254 A1 | 11/1990 |
| DE | 39 39 866 A1 | 6/1991 |
| DE | 41 02 936 A1 | 8/1992 |
| EP | 0 588 490 A1 | 3/1994 |
| WO | WO 95/02243 | 1/1995 |
| WO | WO 98/34789 | 8/1998 |

* cited by examiner

Primary Examiner—Paul W. Huber
Assistant Examiner—Kim-Kwok Chu
(74) Attorney, Agent, or Firm—Christie, Parker & Hale, LLP

(57) ABSTRACT

A device for refracting beams of light, in particular laser beams, with at least one refraction component which can be adjusted by means of a drive unit. The drive unit is formed from the drive of a read/write head of a magnetic data storage component.

17 Claims, 3 Drawing Sheets

OPTICAL INFORMATION SYSTEM WITH MOTOR CONTROLLED REFLECTOR MEANS IN A SWIVEL ARM

FIELD OF THE INVENTION

The invention relates to a device for refracting beams of light, in particular laser beams. Such a device can, for example, be used to accurately direct a laser beam on to a workpiece which is to be processed, to generate graphics, or to inscribe objects by means of laser.

BACKGROUND OF THE INVENTION

Document DE 41 02 936 A1 discloses a facility used to process materials by means of a polarization-modulated laser beam. The facility comprises a laser, a phase modulator, two reflectors rotating around different axes and a focusing lens. By appropriately adjusting the two rotating reflectors, the laser beam can be focused on any point of a surface of a given size by means of the focusing lens. Materials can thereby be processed as required by means of a laser beam.

Document DE 39 39 866 A1 discloses a device for inscribing the surface of a cylindrical shell by means of laser engraving. This device allows a cylindrical shell surface to be inscribed without having to move the workpiece in relation to the laser beam. For this purpose, a rotation-symmetrical ring reflector is provided, and the symmetry axis of this ring reflector coincides with the symmetry axis of the inscription surface which lies on a cylindrical shell. The rotation-symmetrical ring reflector has a curved reflective surface. With the assistance of a refraction unit comprising two reflectors moving on perpendicular axes, a laser beam emitted from a laser beam source is directed from the reflective surface to the inscription surface.

DE 39 15 254 A1 discloses a process and a device for generating an optical marking on the floor in public areas. A concentrated beam of light (e.g. a laser beam), cyclically traversing a given path, is thereby projected onto a floor covering. The light refraction device, which moves the beam of light along the given path, is controlled at such a high frequency that the marking generated on the floor covering appears stationary.

A common factor of the above refraction systems and numerous other similar devices is that the focus of a laser beam is to be directed precisely and/or at a high speed along a specific path. This means that the associated refraction components (reflectors and the like) need to be precisely and quickly adjusted. The refraction components are thereby generally adjusted by means of rotation around a given axis.

In order to manufacture refraction devices of the aforementioned nature, a drive is necessary which allows very rapid and very accurate adjustment of the position (particularly of the angles of rotation) of a refraction component. Such a drive constitutes a considerable cost factor.

It is an object of the invention to create a device for refracting beams of light of the afore-mentioned nature, whereby the refraction components can be adjusted very accurately, rapidly and as cost-effectively as possible.

SUMMARY OF THE INVENTION

A device for processing materials and/or generating signs by means of laser beams comprises first and second refraction components rotating around different axes for the purpose of refracting the laser beams. The refractor components are positioned behind one another in the path of the laser beams and each have an activation connection with a drive unit, by means of which rotate around their respective rotation axis. Drive units of the refraction components are respectively formed from the drive motor and the actuator of a read/write head of a magnetic data storage component with a rotating data storage medium in the form of a disk, and whereby the rotation axes of the refraction components are formed from actuator spindles.

Data storage components of this nature are manufactured in huge quantities. This applies in particular to floppy disk drives and hard disk drives of data processing units which are of particular interest in the present case. Each of these drives has a read/write head which can be moved over the rotating floppy disk or hard disk by means of an appropriate drive. Great precision and great speeds are a particularly important property of these drives, in order to facilitate high storage capacity and short access times.

The three afore-mentioned essential properties of read/write head drives (namely low cost as a result of volume production, great precision and high speeds) are used according to the invention to create an accurate, rapid and cost-effective drive for a refraction system.

Document U.S. Pat. No. 5,319,509 does indeed disclose the positioning of a reflector on the actuator of a data storage component, in order to reflect a laser beam. However, the reflected laser beam is passed on directly to a detector positioned in the data storage component, where its reflection angle is evaluated for the purpose of controlling the movement of the actuator. This document makes no reference to the reflected laser beam being directed to another refraction reflector which is also coupled to an actuator in such a way as to create a device for material processing and/or generating graphics.

Furthermore, WO 95/02243 and U.S. Pat. No. 5,153,870 disclose optical data storage components, whereby a laser beam is reflected by a reflector positioned on the actuator of the respective data storage component and then passed on to the read/write head of the actuator. Once again, however, the laser beam remains within the data storage component.

According to an embodiment of the invention, the drive unit for the refraction component encompasses the drive motor of the read/write head of a data storage component with an exchangeable data storage medium (floppy disk, exchangeable hard disk). The advantage of this embodiment of the invention is that because the data storage medium is exchangeable, the respective drive is not hermetically sealed from the outside world and is therefore generally very robust.

On the other hand, it is the read/write heads of data storage components with fixed data storage media (hard disks) that are characterized by particularly high speed and accuracy. For refraction systems upon which particularly high demands are made, the use of such a drive is advantageous.

In order to drive the refraction component according to the invention, it is possible to use either a stage motor or a continuous drive (linear motor). Stage motors are very robust and they allow absolute adjustment of position and angle. Continuous motors facilitate greater precision and speed during component adjustment. However, absolute adjustment of the position of a component is not generally possible with continuous motors. Reaction coupling, which allows the absolute position to be determined, is necessary. For this purpose, so-called servo-tracks and a servo-head are provided with hard disk drives. These servo-tracks and servo-head are not used for data storage, but instead are used exclusively for determining the absolute position of the read-write heads. Comparable devices for determining the position must also be provided when a continuous drive of a read/write head is used to adjust a refraction component.

According to the invention, not only the drive motor of a magnetic data storage component is used for the drive unit of the refraction component, but use is also made of at least part of the device for converting the driving force of this motor into a movement of the head (e.g. the actuator spindle and an arm which swivels around this spindle). For example, therefore, the drive unit of the refraction component can comprise the motor, the complete actuator and, if appropriate, the drive controller of the magnetic data storage component.

It is particularly simple to couple a rotating refraction component to the drive of a read/write head of a magnetic data storage component if this drive encompasses a rotating actuator. The term actuator is used to describe those drive components of the magnetic data storage component which convert the driving force of the motor into a movement of the head. A rotating actuator has an arm which swivels around a spindle at one end and carries the read/write heads at the other end. Upon connecting a refraction component with such an arm in the region of the actuator spindle, a swivel of the arm results in pure rotation of the refraction component.

In this connection it should be pointed out that the term linear motor is used here to describe continuous motors which can be used with both linear actuators and rotating actuators. In hard disk drives, linear motors are used mainly with rotating actuators, in order to generate an arch movement of the read/write heads.

For the purpose of connecting a refraction component to the arm of an actuator, a rod-like component is particularly suitable, whereby this rod-like component is perpendicular to the arm. It is advantageous if the refraction component itself is a reflector. When using a drive for read/write heads to move a refraction component, the arm can of course also be replaced by another component which carries the refraction component and is positioned appropriately on the actuator spindle.

Particularly when using a continuous drive to move the refraction component, it is advantageous if a sensor component group is provided to determine the angle and/or position of the refraction component. In addition, this sensor component group can be used to determine the speed. One component of the sensor component group can thereby be connected to a component (the arm) moving together with the refraction component, while another component of the sensor component group is connected to a stationary component (the actuator axis). In principle, suitable sensors are all types of sensors which allow the position and/or the angle of a component to be very accurately determined, e.g. optic, magnetic and capacitative sensors. The sensor component group is integrated into a regulating circuit which constantly compares the present position of the refraction component with its guide position and triggers the necessary adjustments in the movement of the refraction component.

The electronic control and regulating unit (the regulating circuit) which controls and regulates the movement of the refraction component can encompass the drive controller of a magnetic data storage component. In this case, therefore, not only electromechanical components (motor and actuator) of a data storage component are used to adjust a refraction component, but use is also made of the control gear (drive controller) of the data storage component. The control unit of the refraction component may in some cases encompass additional processors and data storage components which ensure that the refraction component is controlled as required.

As already explained above, the refraction system according to the invention can be used in any application where laser beams are to be directed accurately and/or quickly to different points. Examples include material processing by means of laser beams, generating graphics by means of laser beams and inscribing with laser beams.

BRIEF DESCRIPTION OF THE DRAWINGS

Further advantages of the invention will now be clarified by reference to an embodiment of the invention as illustrated in the following drawings.

DETAILED DESCRIPTION OF THE PREFERRED EMBODIMENT

Figure 1:
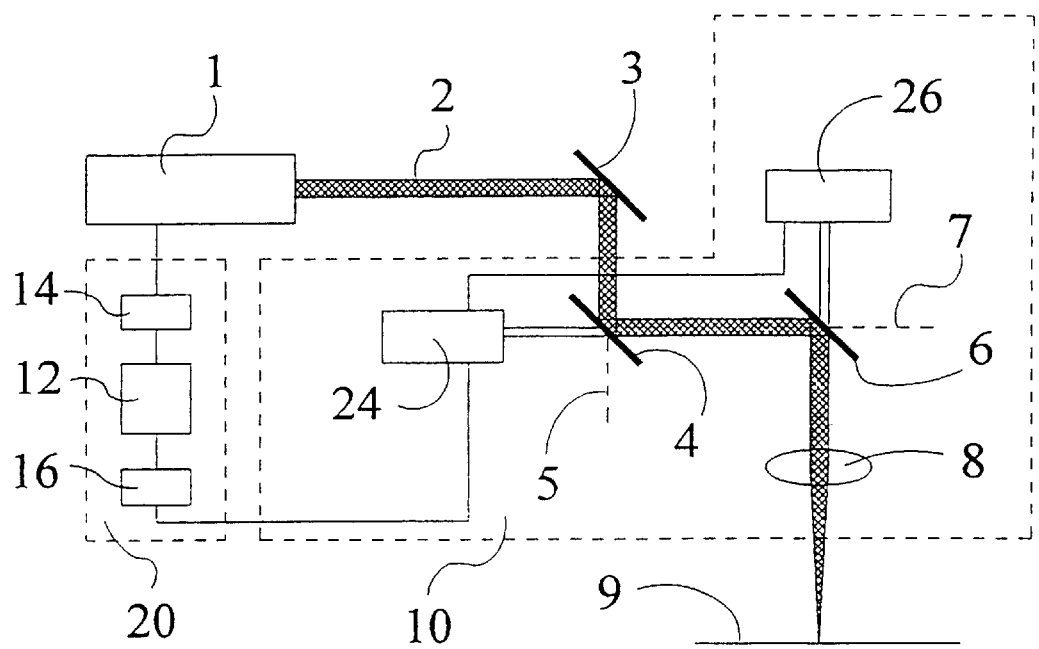
FIG. 1 is a schematic diagram of a refraction system for laser beams with two reflectors which can rotate on different axes.

FIG. 1 shows a refraction system 10 for the laser beam 2 of a laser 1, whereby markings, graphics, inscriptions etc. are to be generated on a surface 9, such as a two-dimensional field, or a plane. It can thereby be either a device for material processing, in which case a surface 9 is, for example, formed by the surface of a workpiece, or it can be a device for generating a stationary image, in which case the surface 9 is formed by reflective material.

Laser 1 can, for example, be a Nd:YAG laser, whereby the laser beam 2 is directed to the refraction system 10 by means of an initial reflector 3. The refraction system 10 encompasses two further reflectors (or refraction components) 4, 6, which can rotate around the axes 5, 7 respectively. The rotation axes 5, 7 of the two reflectors 4, 6 are perpendicular to each other.

By means of the two reflectors 4, 6, the laser beam 2 can be oriented as required in such a way that the laser beam can be concentrated on any point of the given two-dimensional field 9. Of course, it is also possible to have refraction systems with more than two reflectors and hence a greater degree of freedom for orienting the laser beam.

After being directed by the two reflectors 4, 6, the laser beam 2 passes through a field focusing lens system 8, which ensures that the focus point of the laser beam is constantly in the plane 9 as required.

As can also be seen from FIG. 1, a drive unit 24, 26 is allocated to each one of the reflectors 4, 6 and these drive units are controlled by a control unit 20, such as a regulating circuit or an electronic control or regulating unit. The control unit 20 encompasses a microcomputer 12 with corresponding auxiliary components for the input of control commands, a laser control 14 which regulates the operation of the laser 1, and a reflector control 16, such as a drive controller or control circuit, which controls the adjustment of the reflectors 4, 6 through the drive units 24, 26.

The control unit 20 can, for example, be formed by a PC or similar, whereby the laser control 14 and the reflector control 16 are achieved by appropriate software. If additional hardware components are necessary to control laser 1 or reflectors 4, 6, these hardware components are connected to the PC.

The layout of the refraction system 10 described above is already known in principle. The essential difference between the refraction system according to the invention and the known refraction systems is that according to the invention the drive units 24, 26 of the reflectors 4, 6 are formed respectively from drives of read/write heads for magnetic data storage components.

Figure 2:
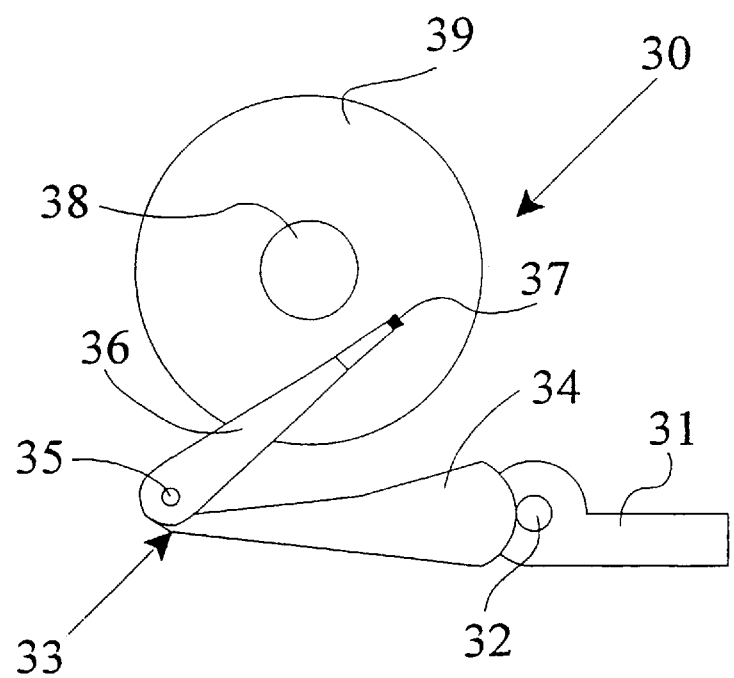
FIG. 2 is a schematic diagram of a hard disk drive, whereby the read/write head is moved by an actuator with a stage motor.

FIG. 2 shows a schematic diagram of a hard disk drive 30 viewed from above. It shows the drive components for read/write heads which are used to adjust the reflectors. The hard disk drive 30 encompasses a stage motor (or drive motor) 31 with a motor shaft 32, as well as an actuator 33. The actuator is activated in connection with the stage motor 31 and carries read/write heads 37. The hard disk drive 30 also encompasses a hard disk 39 which rotates on the spindle shaft 38 of a spindle motor (which is not illustrated).

The actuator 33 consists of a drive lever 34, which is in contact with the motor shaft 32 of the stage motor 31 (e.g. rubbing or interlocking), and an arm 36 which can swivel around an actuator spindle 35, which is also the rotation axis of the respective refraction component, by means of the motor-driven movement of the drive lever 34. The arm 36 carries the read/write heads 37 on its front end. The stage motor 31 is controlled by a drive controller (not illustrated) in such a way that the read/write heads 37 are positioned as required over the hard disk 39 for the purpose of reading or storing data. The drive controller can either be integrated into a microcomputer or into the hard disk drive itself. In the latter case, it is known as an intelligent drive.

With hard disk drives it is particularly important that the read/write heads 37 can access very precise, specified areas on the hard disk 39. In addition, this must occur within very short time periods, in order to minimize access time to the data. These properties of hard disk drives can be used very effectively for controlling reflectors for refraction systems.

In this connection, it should be pointed out that the hard disk drive shown in FIG. 2 is merely an example of an embodiment of the invention. According to the invention, other hard disk drives or floppy disk drives can also be used, including scanning facilities of audio-visual drives (e.g. CD-ROM). Also, other scanning facilities that may be available in the future can be used, whereby these scanning facilities meet the requirements in relation to precision and quick positioning.

Figure 3:
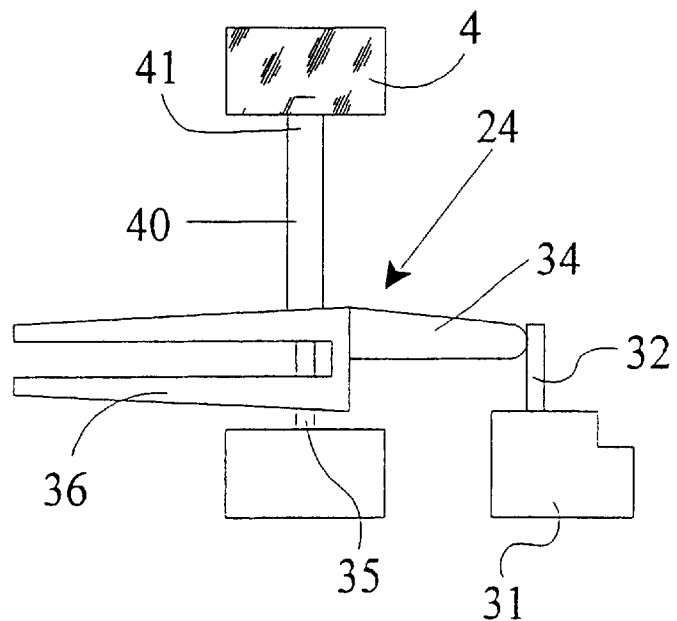
FIG. 3 is a diagram of the refraction device according to the invention for a refraction system according to FIG. 1, whereby the drive unit for a read/write head as shown in FIG. 2 is used.

By reference to FIG. 3, it can be clearly seen how the drive 30 shown in FIG. 2 can be used as a drive unit 24 for adjusting the position of a reflector 4. FIG. 3 shows the side view of the stage motor 31 of a drive 30 according to FIG. 2, whereby the motor shaft 32 has an activation connection (only schematically shown here) with the drive lever 34 of an actuator. A rod-like component 40 runs vertically upwards from the arm 36 which swivels around the actuator spindle 35. On the upper end 41 of the rod-like component 40, there is a reflector 4. The rod-like component 40 is concentrically oriented in relation to the actuator spindle 35. Accordingly, the center line of the actuator spindle 35 also forms the center line of the rod-like component 40.

Due to the afore-mentioned positioning of the rod-like component 40, each swivel movement of the arm 36 triggered by the stage motor 31 is converted into a rotation of the reflector 4. The rotation movements can be carried out with great speed and precision (angular accuracy), as the drive unit 24 shown in FIG. 3 is the drive unit of a read/write head for magnetic data storage components. Speed and precision are necessary pre-conditions for such magnetic data storage components to be used for reading and/or writing data.

In order to control the stage motor 31, a programmable computer can be used which has auxiliary components for input of the necessary control commands. In order to convert the control commands from the microcomputer and to transfer them to the electronic unit of the stage motor 31, a drive controller can be used as part of the reflector control. See the control unit 20 in FIG. 1 which encompasses a microcomputer 12 and a reflector control 16. The drive controller, which serves as a connecting link between the computer and the magnetic data storage component during the conventional use of the drive unit 24 for moving read/write heads, can also then be used as a corresponding connecting link when the drive unit 24 is used for adjusting a reflector.

Figure 4:
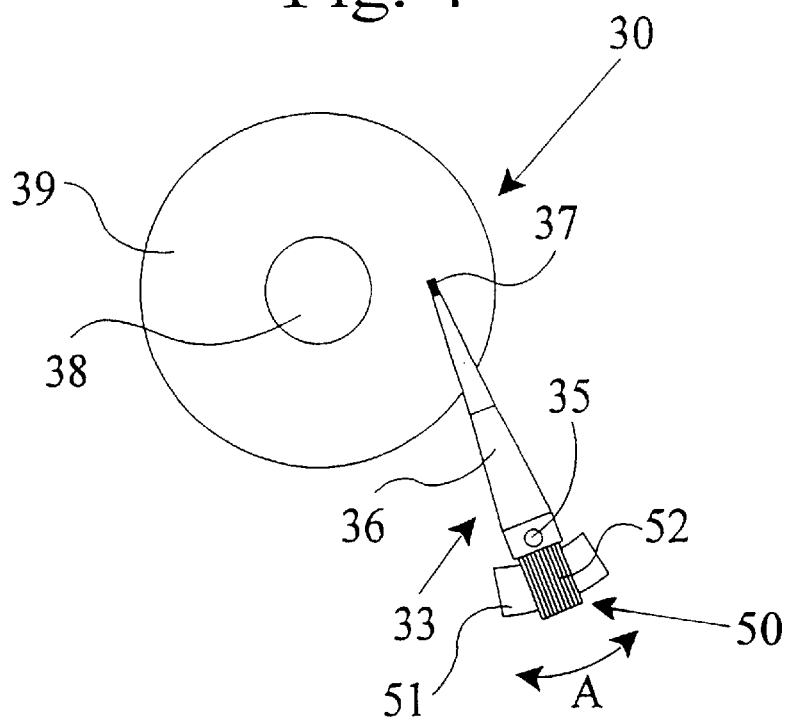
FIG. 4 is a schematic diagram of a hard disk drive, whereby the read/write head is moved by an actuator with a linear motor.

FIG. 4 shows a schematic diagram of a hard disk drive 30 viewed from above, whereby in order to drive the read/write heads 37, there is a rotating actuator 33 with a linear motor 50 (such as a continuous or drive motor). Essential components of the linear motor 50 are a stationary permanent magnet 51 and, on top of the magnet, a coil 52 which can be moved in direction A, and whereby the coil 52 is secured to the arm 36 of the read/write heads 37. Apart from the layout of the drive motor 50 of the arm 36, the hard disk drive 30 shown in FIG. 4 corresponds to the hard disk drive shown in FIG. 2. The same components are given the same reference numbers in both drawings.

When the drive 50 is activated, the arm 36 swivels around the fixed spindle 35 in such a way that the read/write heads 37 can be continuously moved to a specified position over the hard disk 39. As the length of the lever (from the actuator spindle 35 to the read/write heads 37) is considerably greater than the length of the lever (from the actuator spindle 35 to the coil 52), a small movement of the coil is thereby converted into a large movement of the head. This means that with minimal electric current consumption by the coil 52, very short positioning times are achieved.

With hard disk drives of the nature shown in FIG. 4, one of the read/write heads is generally formed as a servo-head. A so-called servo-track or index track of the hard disk is allocated to this servo-head. The servo-track forms a reference track, by means of which the servo-head recognizes the positioning of the read/write heads over the hard disk. This facilitates extremely precise regulation of the movement of the read/write heads and enables them to be exactly positioned over the hard disk. Alternatively, a separate sensor component group 55 can be provided which detects the position of the arm.

Figure 5:
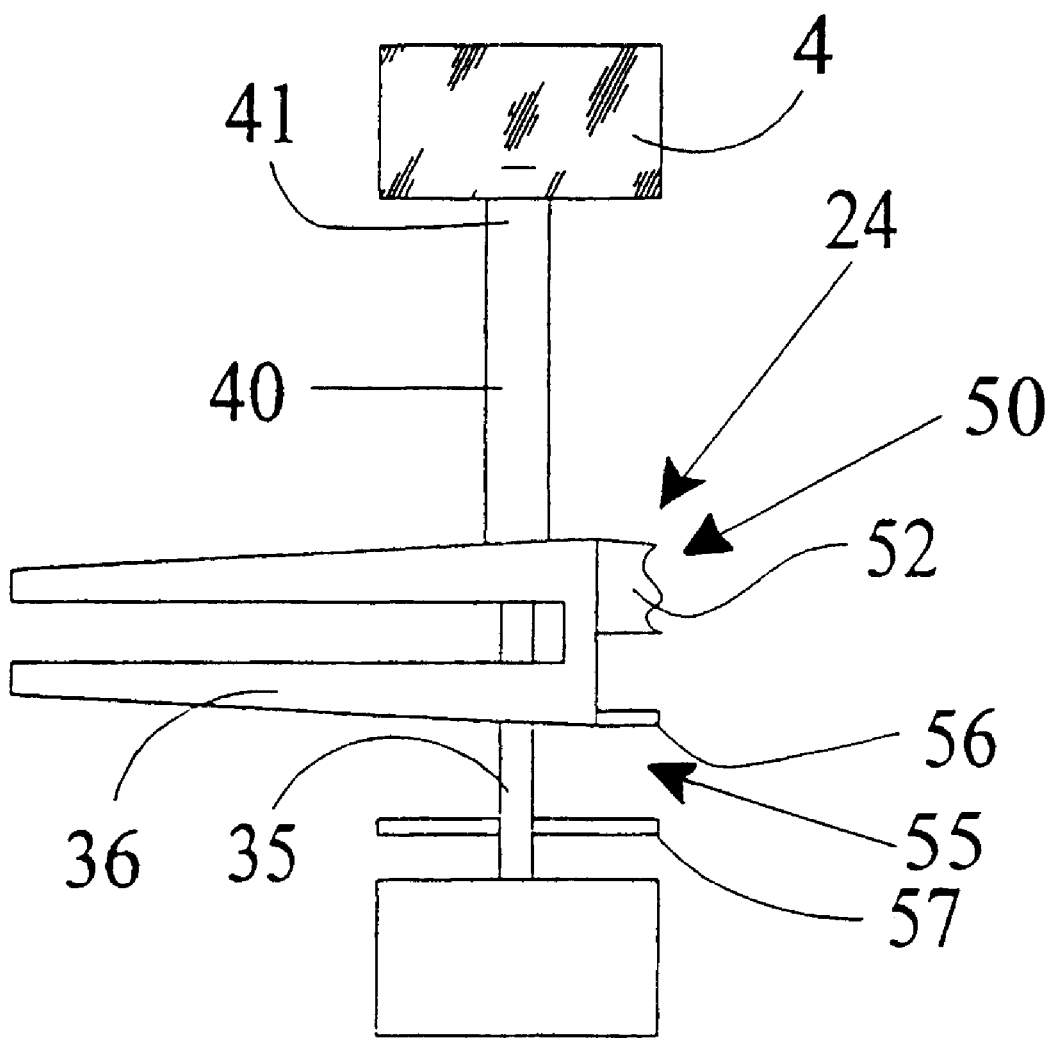
FIG. 5 is a diagram of the refraction device according to the invention for a refraction system according to FIG. 1, whereby the drive unit for a read/write head as shown in FIG. 4 is used.

FIG. 5 shows the side view of an example of a refraction system for a reflector 4, whereby the (continuous) linear drive motor 50 shown in FIG. 4 can be used to move the arm 36 around the spindle 35, and whereby the detailed illustration of the linear drive motor 50 has not been included in FIG. 5. The connection between the arm 36 and the reflector 4 is achieved here in the same way as in the embodiment of the invention according to FIG. 3. The movement of the reflector 4 also corresponds to that explained with reference to FIG. 3.

In the present embodiment of the invention, however, the arm 36 also carries a sensor component group 55 having a sensor 56 (e.g. an optic sensor), to which a fixed (e.g. secured to the spindle 35) angle gauge 57 is allocated. The rotation angle, the rotation speed, and the position of the arm 36, and thus of the reflector 4, can thereby be determined at any time. They can also be adjusted very accurately through a corresponding regulating circuit assisted by the drive motor 50 illustrated in FIG. 4.

When such a sensor-regulated drive 24 is used in a refraction system 10 according to FIG. 1, the control circuit 16, 24 must be replaced by an appropriate regulating circuit, in such a way that the sensor signals can be used to regulate the movement of the reflector 4. (The circuit diagram of FIG. 1 remains unchanged here; the function of block 16 merely changes from a control facility to a regulating facility.) Suitable sensors are not only optic sensors but, for example, also magnetic or capacitative component groups. The two components 56 and 57 of the sensor component group 55 can thereby be secured to any components which are moved to each other when the reflector 4 swivels. The sensor component group 55 can be built into the drive of the read/write heads of a data storage component or it can be added at a later stage.

What is claimed is:

1. A device for processing information and/or generating signals by means of a laser beam, comprising:
    first and second drive units; and
    first and second deflection components rotating around first and second axes, respectively, wherein the first axis is different from the second axis, wherein the deflection components rotate for the purpose of deflecting the laser beam, and are positioned behind one another in the path of the laser beam and wherein the first and second deflection components have an activation connection with the first and second drive units, respectively, by means of which they rotate around their respective rotation axis;
    wherein the drive units each include a drive motor and an actuator of a read/write head of a data storage component with a rotating data storage medium in the form of a disk, each actuator having an axis of rotation;
    wherein the rotation axes of the first and second deflection components are formed by the actuator axes of the first and second drive units, respectively;
    wherein the first drive unit includes an arm which can swivel around the actuator axis of the first drive unit, and wherein this arm is connected to the first deflection component.

2. A device according to claim 1 wherein at least one of the drive units includes a stage controlled motor.

3. A device according to claim 1 wherein at least one of the drive units includes a linear motor.

4. A device according to claim 1 wherein the first deflection component is connected to the swivel arm in such a way that when the arm swivels, the deflection component rotates.

5. A device according to claim 1 wherein the first deflection component is connected to the swivel arm by means of a rod-like component.

6. A device according to claim 1 wherein a deflection component is connected to an arm of a read/write head.

7. A device according to claim 1 wherein at least one of the deflection components is formed as a reflector.

8. A device according to claim 1 wherein at least one of the drive units has an activation connection with an electronic control unit.

9. A device according to claim 8 wherein the electronic control unit includes a drive controller of a data storage component.

10. A device according to claim 9 wherein the device is formed as an inscription head for a laser.

11. A device for processing information and/or generating signals by means of a laser beam, comprising:
    first and second drive units;
    first and second deflection components rotating around first and second axes, respectively, wherein the first axis is different from the second axis, wherein the deflection components rotate for the purpose of refracting the laser beam, and are positioned behind one another in the path of the laser beam and wherein the first and second deflection components have an activation connection with the first and second drive units, respectively, by means of which they rotate around their respective rotation axis; and
    a sensor component group determining at least one of an angle, a position, and a speed of at least one of the deflection components;
    wherein the drive units each include a drive motor and an actuator of a read/write head of a data storage component with a rotating data storage medium in the form of a disk, each actuator having an axis of rotation;
    wherein the rotation axes of the first and second deflection components are formed by the actuator axes of the first and second drive units, respectively;
    wherein the sensor component group includes first and second components, wherein the first component is connected to an arm which moves together with the first deflection component, and the second component of the sensor component group is connected to the actuator axis of the first drive unit.

12. A device according to claim 11 wherein the sensor component group is integrated into a regulating circuit regulating the movement of at least one of the deflection components.

13. A device according to claim 12 wherein at least one of the deflection components is formed as a reflector.

14. A device according to claim 12 wherein at least one of the drive units has an activation connection with an electronic control unit.

15. A device according to claim 14 wherein the electronic control unit includes a drive controller of a data storage component.

16. A device according to claim 15 wherein the device is formed as an inscription head for a laser.

17. A device according to claim 11 wherein a deflection component is connected to an arm of a read/write head.

* * * * *

UNITED STATES PATENT AND TRADEMARK OFFICE
CERTIFICATE OF CORRECTION

PATENT NO. : 6,721,241 B1  
DATED : April 13, 2004  
INVENTOR(S) : Kuntze

It is certified that error appears in the above-identified patent and that said Letters Patent is hereby corrected as shown below:

Title page,
Item [30], Foreign Application Priority Data, delete "196 54 845" and insert
-- 196 54 845.4 --.
Item [57], ABSTRACT,
Lines 1 and 2, delete "refracting" and insert -- deflecting --.

Column 8,
Line 23, delete "purpose of refracting" and insert -- purpose of deflecting --.

Signed and Sealed this

Second Day of May, 2006

JON W. DUDAS
*Director of the United States Patent and Trademark Office*